US010173705B2

(12) United States Patent
Tofflemire

(10) Patent No.: US 10,173,705 B2
(45) Date of Patent: Jan. 8, 2019

(54) CART SUSPENSION SYSTEM

(71) Applicant: TOFCO INDUSTRIES, INC., Downey, CA (US)

(72) Inventor: David Tofflemire, Downey, CA (US)

(73) Assignee: TOFCO INDUSTRIES, INC., Downey, CA (US)

( * ) Notice: Subject to any disclaimer, the term of this patent is extended or adjusted under 35 U.S.C. 154(b) by 232 days.

(21) Appl. No.: 14/981,726

(22) Filed: Dec. 28, 2015

(65) Prior Publication Data

US 2016/0185373 A1   Jun. 30, 2016

Related U.S. Application Data

(60) Provisional application No. 62/097,817, filed on Dec. 30, 2014.

(51) Int. Cl.
| | |
|---|---|
| *B62B 3/04* | (2006.01) |
| *B60G 3/01* | (2006.01) |
| *B60G 11/27* | (2006.01) |
| *B60G 3/20* | (2006.01) |
| *B62D 63/06* | (2006.01) |

(52) U.S. Cl.
CPC .................. *B62B 3/04* (2013.01); *B60G 3/01* (2013.01); *B60G 3/20* (2013.01); *B60G 11/27* (2013.01); *B60G 2200/144* (2013.01); *B60G 2200/44* (2013.01); *B60G 2200/445* (2013.01); *B60G 2300/36* (2013.01); *B60G 2300/37* (2013.01); *B62D 63/064* (2013.01)

(58) Field of Classification Search
CPC .......... B62B 3/04; B60G 3/12; B60G 3/1418; B60G 3/185; B60G 3/20; B60G 3/207; B60G 11/27; B60G 17/0525; B60G 2200/13; B60G 2200/445; B60G 2300/37; B62D 63/064

See application file for complete search history.

(56) References Cited

U.S. PATENT DOCUMENTS

| | | | | |
|---|---|---|---|---|
| 2,052,309 | A | * | 8/1936 | Kovach .................. B60G 3/185 267/250 |
| 2,896,909 | A | | 7/1959 | Taylor |
| 3,363,913 | A | * | 1/1968 | McFarland .............. B60G 5/04 180/24.02 |
| 3,521,898 | A | | 7/1970 | Fulmer et al. |
| 3,655,214 | A | | 4/1972 | Lane et al. |
| 3,726,541 | A | | 4/1973 | Connell |

(Continued)

FOREIGN PATENT DOCUMENTS

WO   WO-2014198861 A1 * 12/2014   ............. A63G 31/16

OTHER PUBLICATIONS

Copenheaver, Blaine R.; International Search Report; PCT/US2015/067918; dated Mar. 4, 2016; 4 pages.

*Primary Examiner* — Barry Gooden, Jr.

(74) *Attorney, Agent, or Firm* — Stetina Brunda Garred and Brucker

(57) ABSTRACT

A cargo dolly having a suspension assembly incorporated therein, wherein the suspension assembly is adapted to maintain the dolly at a prescribed height relative to an underlying surface. Thus, as cargo is loaded onto the dolly, and subsequently unloaded from the dolly, the dolly will substantially remain at the same height, which facilitates use of the dolly with standardized loading docks, such as loading docks associated with aircraft.

11 Claims, 10 Drawing Sheets

(56) References Cited

U.S. PATENT DOCUMENTS

| | | | | |
|---|---|---|---|---|
| 3,866,935 A * | 2/1975 | Nelson | B60P 1/18 | 280/43.23 |
| 4,230,341 A * | 10/1980 | Hart | B60G 17/033 | 280/124.128 |
| 4,335,901 A * | 6/1982 | Gladish | B60G 17/04 | 267/64.28 |
| 4,878,691 A * | 11/1989 | Cooper | B60G 11/27 | 280/124.128 |
| 4,930,806 A * | 6/1990 | Walker, Jr. | B60G 3/14 | 280/124.128 |
| 5,275,430 A * | 1/1994 | Smith | B60G 3/20 | 280/124.132 |
| 5,860,661 A * | 1/1999 | Boucher | B60B 27/00 | 188/181 R |
| 5,863,049 A * | 1/1999 | Mahvi | B60G 3/145 | 280/414.5 |
| 5,918,692 A * | 7/1999 | Sekita | B60G 3/14 | 180/56 |
| 7,043,932 B2 * | 5/2006 | Tofflemire | B60H 1/00014 | 62/236 |
| 2001/0045719 A1 * | 11/2001 | Smith | B60G 3/14 | 280/124.116 |
| 2002/0130479 A1 * | 9/2002 | Eckelberry | B60G 9/00 | 280/124.109 |
| 2003/0005677 A1 * | 1/2003 | Oka | A01D 34/661 | 56/229 |
| 2005/0263987 A1 * | 12/2005 | Smith | B60G 3/14 | 280/683 |
| 2006/0064993 A1 | 3/2006 | Tofflemire | | |
| 2006/0244225 A1 * | 11/2006 | Power | B60G 9/003 | 280/6.151 |
| 2008/0252025 A1 * | 10/2008 | Plath | B60G 9/003 | 280/5.514 |
| 2008/0258419 A1 * | 10/2008 | Baroni | B60G 3/20 | 280/124.157 |
| 2010/0117319 A1 * | 5/2010 | Grozev | B60G 15/12 | 280/124.16 |
| 2010/0117320 A1 * | 5/2010 | Grozev | B60G 11/58 | 280/124.16 |
| 2010/0237574 A1 * | 9/2010 | Allaire | B60G 5/02 | 280/28.5 |
| 2011/0248474 A1 * | 10/2011 | Williams | B60D 1/02 | 280/482 |
| 2011/0299963 A1 * | 12/2011 | Aubrey | B60P 1/027 | 414/484 |
| 2012/0183380 A1 * | 7/2012 | Aubrey | B60P 1/027 | 414/484 |
| 2015/0251515 A1 * | 9/2015 | Joachim | B60G 11/27 | 280/5.514 |
| 2016/0096407 A1 * | 4/2016 | Dames | B60G 3/20 | 280/838 |
| 2016/0140861 A1 * | 5/2016 | Tischer | A63G 31/16 | 434/69 |

* cited by examiner

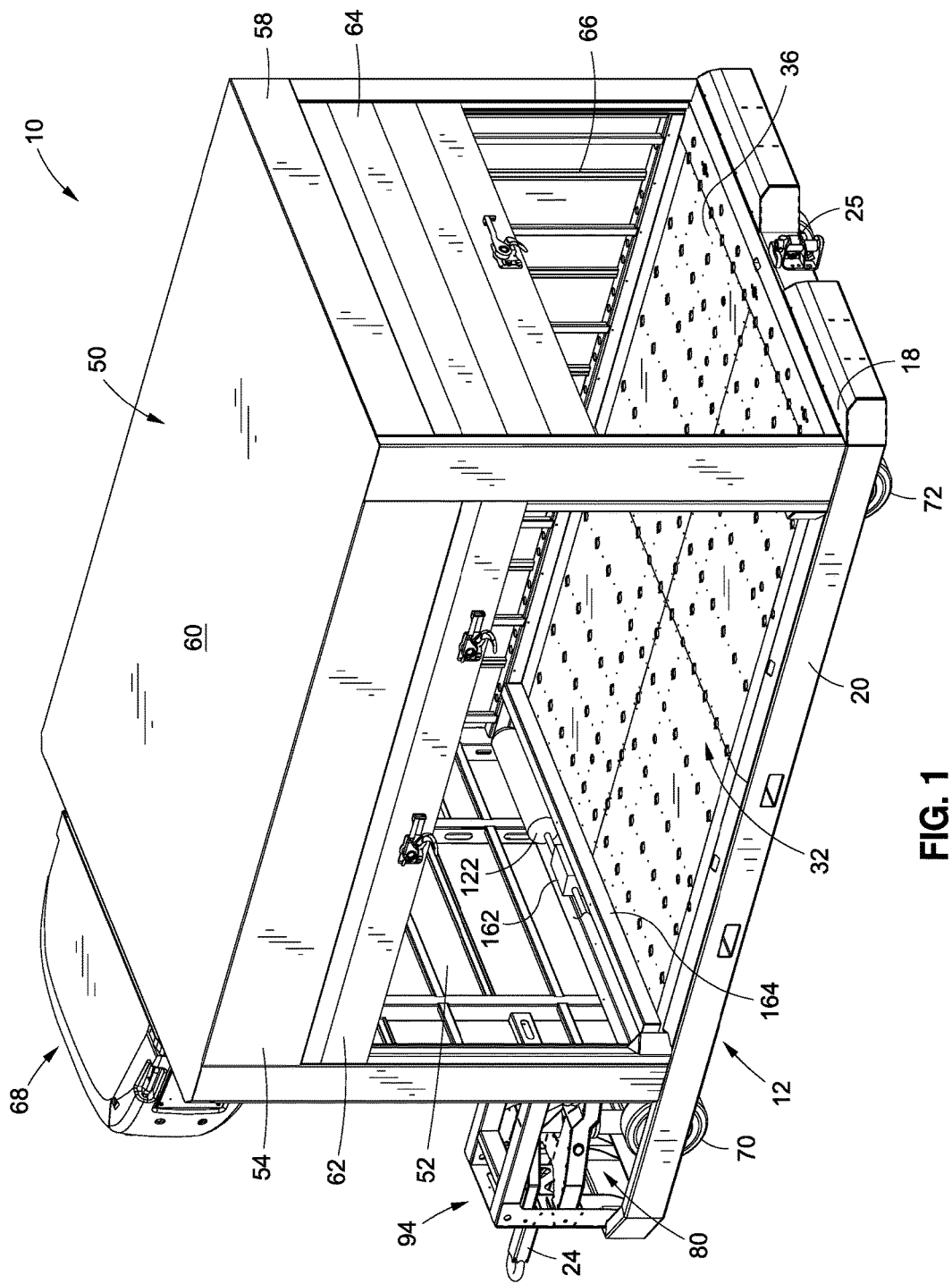

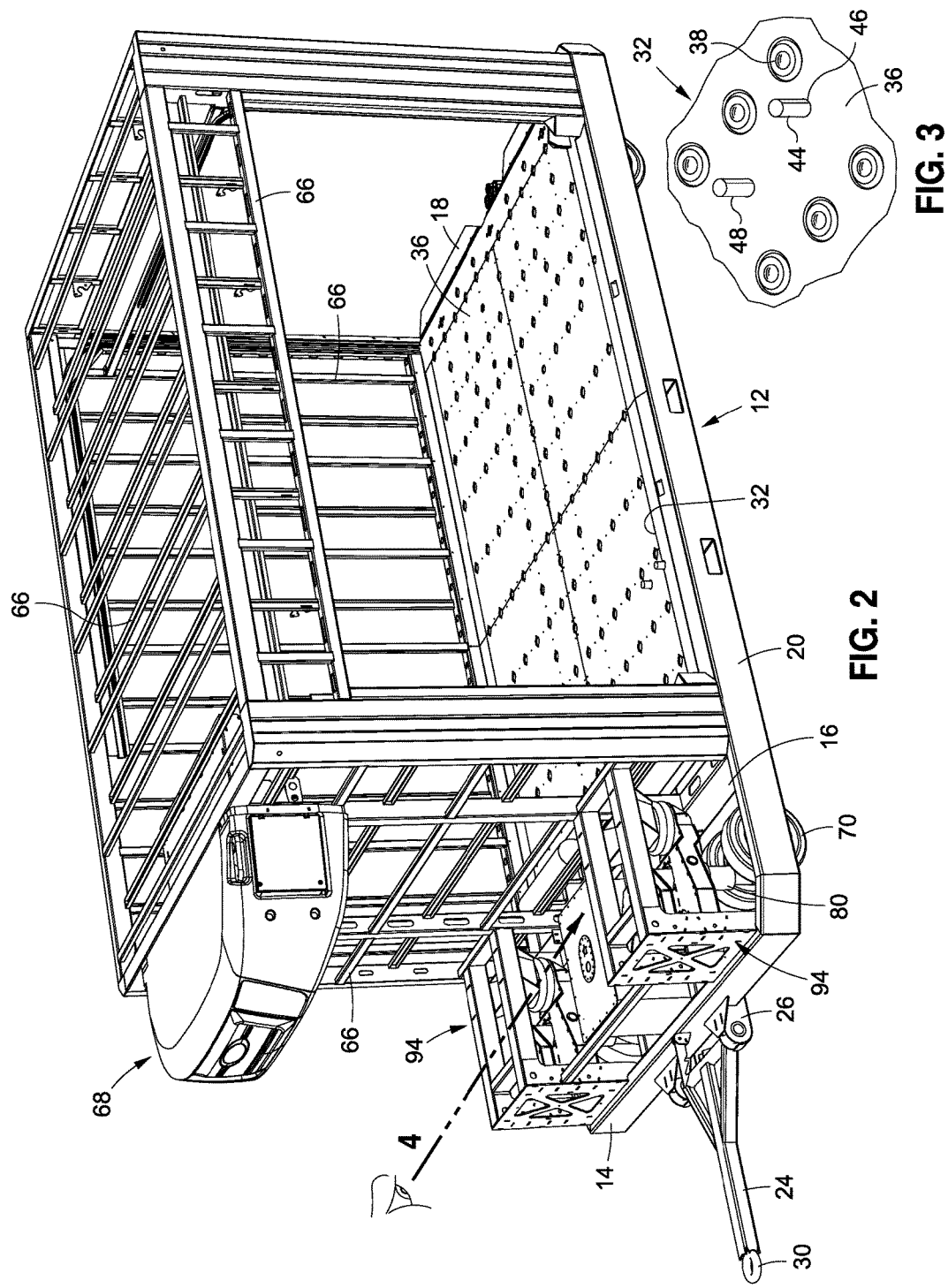

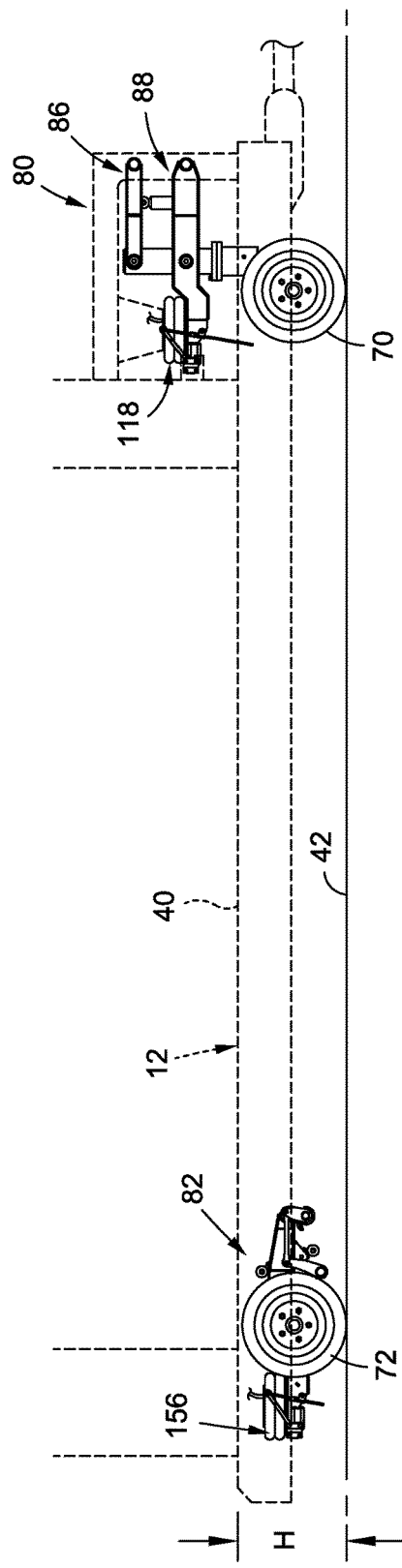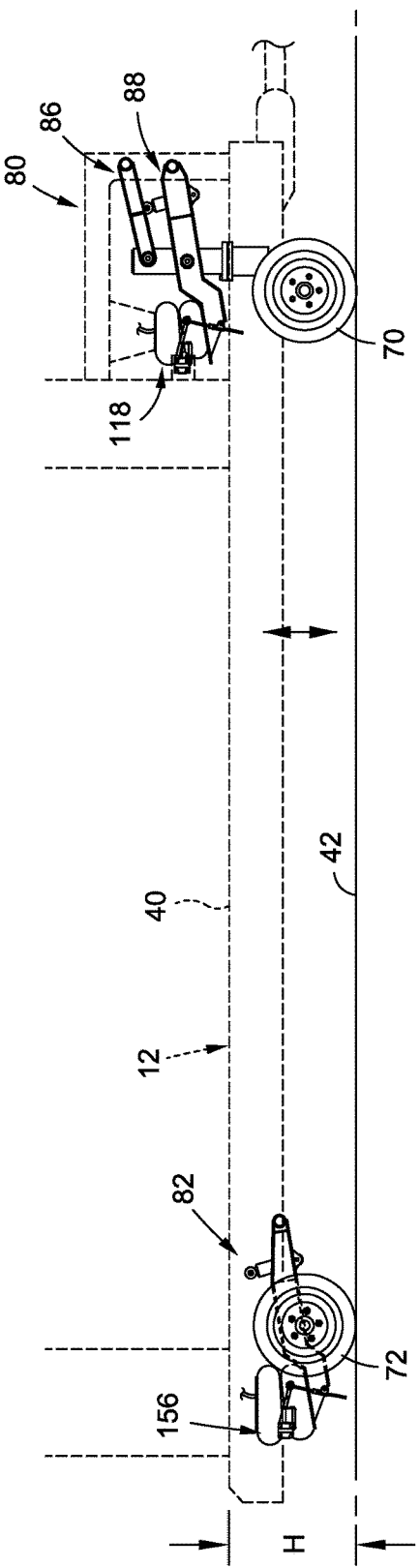

CART SUSPENSION SYSTEM

CROSS-REFERENCE TO RELATED APPLICATIONS

The present application claims priority to U.S. Provisional Patent Application Ser. No. 62/097,817, entitled CART SUSPENSION SYSTEM, filed on Dec. 30, 2014, all of the teachings of which are incorporated herein by reference.

STATEMENT RE: FEDERALLY SPONSORED RESEARCH/DEVELOPMENT

Not Applicable

BACKGROUND

The present disclosure is generally directed toward a suspension system, and more specifically to a suspension system for a cargo dolly adapted to maintain a loading deck of the cargo dolly at a prescribed height as cargo is loaded onto the dolly, and subsequently, unloaded from the dolly.

The transport of perishable cargo by aircraft is well-known in the art. In this regard, such perishable cargo, which can encompass any type of product that must be maintained in a temperature-controlled environment, can only be efficiently and timely delivered by aircraft in many parts of the world. In fact, shipping via air may be the only viable option of transporting many types of perishable goods. Exemplary of such type of goods include fresh produce, seafood, meat products, blood and a variety of other temperature-sensitive medications, such as vaccines and the like. Perishable cargo will also encompass many other types of products well-known to those skilled in the art.

While in some cases, the duration that perishable cargo must go without being refrigerated (or heated) is of so short duration as to not affect the cargo, in many other instances perishable cargo will go for sufficient lengths of time from when delivered in a refrigerated condition at the airport to when the cargo is actually loaded on a plane. In this latter scenario, failure to continue providing adequate environmental control will cause the cargo to start spoiling, completely spoil, or otherwise become unusable for its intended purpose. Such phenomena occur very frequently with respect to food items and other heat sensitive materials such as blood and other biological/pharmaceutical products. The frequency that such damage occurs is also substantially high in areas having extremely hot climates as occurs in major cities in the states of Arizona, Nevada, New Mexico, and Texas during the summer months. Numerous other cities throughout the world likewise experience such extreme temperatures.

In practice, perishable cargo is typically containerized at refrigerated terminals and held in refrigeration until the same is transported to airlines, typically via refrigerated roller floor trucks, prior to flight time. As soon as such trucks are unloaded at the designated terminal at the airport, airline containers containing perishable cargo are first weighed and then placed into open container transport dollies for transport to the aircraft. At such point in the shipping process, however, the perishable cargo is no longer maintained in a temperature-controlled environment. As is well-known to those skilled in the art, such point in the transport of such cargo is referred to as a breaking in the "cool chain" where the perishable cargo is vulnerable to the temperatures of the external environment. During such time, the airline containers containing such perishable cargo will sit upon such open transport dollies, in some cases for up to four or more hours, and often times will be exposed to direct sunlight and extreme temperatures before ultimately being loaded into an aircraft for departure.

Such interval makes the perishable cargo especially vulnerable and it is during such time that substantial damage can occur by virtue of being exposed to a non-temperature controlled environment. In this regard, from the time that the temperature-controlled cargo is delivered to the airport and ultimately loaded on a plane, where the cargo is kept out of direct sunlight and at least protected to some extent by air conditioning, presents a significant risk that often times causes irreparable damage to the cargo resulting in substantial financial losses and property destruction.

These same issues also arise with respect to perishable air cargo being unloaded from aircraft. As discussed above, such interval from when the perishable cargo is unloaded from the aircraft to the time from when the same is ultimately stored in a temperature-controlled environment places such perishable cargo at substantial risk.

In addition to the foregoing problems associated with the potential spoilage of perishable air cargo resulting from a break in the "cool chain" is the additional vulnerability that such cargo can be tampered with, damaged, lost or even stolen. In this regard, many complications can and often do arise with respect to the transport of cargo to and from storage facilities to aircraft that, given the open nature by which perishable/high value cargo is transported, present numerous opportunities where such unfortunate events can occur. Indeed, the risk for perishable/high value cargo to become lost, damaged or stolen is exceptionally high at major airports that are very large and encounter heavy volumes of air traffic.

In fact, such vulnerability may even be deemed to pose a potential threat to safety and even national security. With respect to the former, it is well-known that the importation of numerous types of perishable cargo, and in particular agricultural products, can (or must) be inspected to insure that the same is not contaminated, whether by parasites, insects or any other type of contamination. In addition or, alternatively, the open nature by which air cargo is typically transported presents an opportunity that the same will go unchecked and thus exposes a vulnerability that the cargo can be detrimentally manipulated.

In view of the foregoing, Tofco Industries, Inc., Assignee of the present application, has developed a temperature controlled cargo transport dolly for use in transporting perishable/high value cargo to and from an aircraft. Exemplary of such apparatus is disclosed in U.S. Pat. No. 7,043,932, entitled Temperature Controlled Air Cargo Container Transport Dolly, the contents of which are expressly incorporated herein by reference. The temperature controlled cargo transport dolly includes a housing having an enclosure, and a temperature control unit attached to the housing and adapted to control the temperature within the enclosure.

Although the previously designed temperature controlled cargo transport dolly addressed many of the then-existing deficiencies associated with conventional transport containers or dollies by incorporating a temperature control unit into the dolly, there are certain limitations associated therewith. For instance, the dolly is generally operated at slow speeds to mitigate shock-related damage to the temperature control unit, as well as to the cargo being transported within the dolly. Along these lines, previous temperature controlled transport dollies typically do not include suspensions because a conventional suspension would result in a varying height of the dolly cargo deck, e.g., a heavier load would cause the deck to lower, while a lighter load would cause the deck to rise. In many instances, the dollies are used with loading docks that have a universal height requirement, such as around 20.5 inches in the air cargo industry. Thus, a dolly having a variable deck height would be difficult to use with a fixed, universal loading dock height.

Therefore, there is a substantial need in the art for temperature controlled cargo dolly having suspension capabilities, while at the same time being capable of maintaining a prescribed height of a dolly loading deck. Various aspects of the present disclosure address this particular need, as will be discussed in more detail below.

BRIEF SUMMARY

According to various aspects of the present disclosure, there is provided a cargo dolly having a suspension assembly incorporated therein, wherein the suspension assembly is adapted to maintain the dolly at a prescribed height relative to an underlying surface. Thus, as cargo is loaded onto the dolly, and subsequently unloaded from the dolly, the dolly will substantially remain at the same height, which facilitates use of the dolly with standardized loading docks, such as loading docks/K Loaders associated with aircraft.

According to one embodiment, the dolly includes a chassis, a tow bar coupled to the chassis, and a deck coupled to the chassis and having a deck surface spaced from a ground plane by a first distance. At least two front wheels are coupled to the chassis and are rotatable about respective front wheel axes, with the at least two front wheels being adapted to roll on the ground plane. At least two rear wheels are coupled to the chassis and are rotatable about respective rear wheel axes, with the at least two rear wheels being in spaced relation to the at least two front wheels and adapted to roll on the ground plane. At least two front suspension assemblies connect respective ones of the at least two front wheels to the chassis, with each front suspension assembly being adapted to enable movement of a corresponding front wheel axis relative to the chassis. At least two rear suspension assemblies connect respective ones of the at least two rear wheels to the chassis, each rear suspension assembly being adapted to enable movement a corresponding rear wheel axis relative to the chassis. A front leveler is operatively coupled to the at least two front suspension assemblies and is adapted to individually adjust the at least two front suspension assemblies for moving the corresponding front wheel axes relative to the chassis. A rear leveler is operatively coupled to the at least two rear suspension assemblies and is adapted to individually adjust the at least two rear suspension assemblies for moving the corresponding rear wheel axes relative to the chassis. The front leveler and the rear leveler are collectively configured to adjust the respective at least two front suspension assemblies and at least two rear suspension assemblies to maintain the deck and at a prescribed distance relative to the ground plane.

Each of the at least two front wheels may be capable of swiveling about respective swivel axes extending generally perpendicular to the ground plane. The front wheels may be capable of swiveling 360 degrees, and thus, may function as a caster under a respective front suspension assembly.

The front leveler and the rear leveler may be collectively configured to maintain the first distance between 18 and 23 inches. The front leveler and the rear leveler may be further collectively configured to adjust the respective at least two front suspension assemblies and at least two rear suspension assemblies to maintain the deck substantially parallel to the ground plane.

Each front leveler may include at least one inflatable body operatively coupled to a respective one of the at least two front suspension assemblies, with the at least one inflatable body being selectively transitional between an inflated configuration and a deflated configuration, wherein transition from the deflated configuration toward the inflated configuration enables the suspension to counteract an increased load applied on the suspension from the chassis. The air cargo transport dolly may further include a source of pressurized fluid fluidly connected to the at least one inflatable body.

Each front suspension assembly may include a first/upper arm adapted to pivot relative to the chassis, with a portion of the first arm residing in a first plane. A second/lower arm may be operatively coupled to the first arm, with the second arm being adapted to pivot relative to the chassis, and a portion of the second arm may reside in a second plane. The first and second planes may remain parallel to each other as the first and second arms pivot relative to the chassis. Each front suspension assembly further includes a rod pivotally coupled to the first/upper arm and the second/lower arm.

The air cargo transport dolly may further include a housing coupled to the chassis, with the housing and the deck being configured to collectively define an enclosure for storing cargo. The housing may include at least one door. A temperature control unit may be coupled to the housing and adapted to control a temperature within the enclosure.

According to another embodiment, there is provided method of transporting cargo. The method includes receiving cargo on a dolly having a deck including a deck surface spaced from a ground plane, a plurality of wheels adapted to roll on the ground plane, and a suspension assembly, with the plurality of wheels being coupled to the deck via the suspension assembly. The suspension assembly is adapted to impart a variable suspension force on the deck. The method includes adjusting the suspension force imparted on the deck from the suspension assembly so as to maintain the deck surface at a prescribed distance from the ground plane.

The suspension force may be increased as a weight associated with the cargo increases, and the suspension force may be decreased as the weight associated with the cargo decreases.

The suspension assembly may include an inflatable body, and the adjusting step may include adjusting a fluid pressure within the inflatable body to adjust the suspension force imparted on the deck. The suspension force may be increased by adding fluid to the inflatable body to increase the fluid pressure, and the suspension force may be decreased by exhausting fluid from the inflatable body.

The dolly may further include a housing coupled to the deck to define an enclosure, and the method may further include the step of monitoring a temperature within the enclosure. The method may also comprise adjusting the temperature within the enclosure to maintain the temperature within the enclosure within a prescribed temperature range.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 is a rear upper perspective view of an air cargo dolly having a temperature control unit and an adjustable suspension assembly;

FIG. 2 is an upper perspective view of the air cargo dolly shown in FIG. 1, with the wall panels removed therefrom to expose a structural support assembly;

FIG. 3 is a partial upper perspective view of a deck including a plurality of deck rollers and retractable pegs;

FIG. 15 is a side view of the front and rear suspension assemblies in their respective first positions; and FIG. 16 is a side view of the front and rear suspension assemblies in their respective second positions.

DETAILED DESCRIPTION

Figure 4:
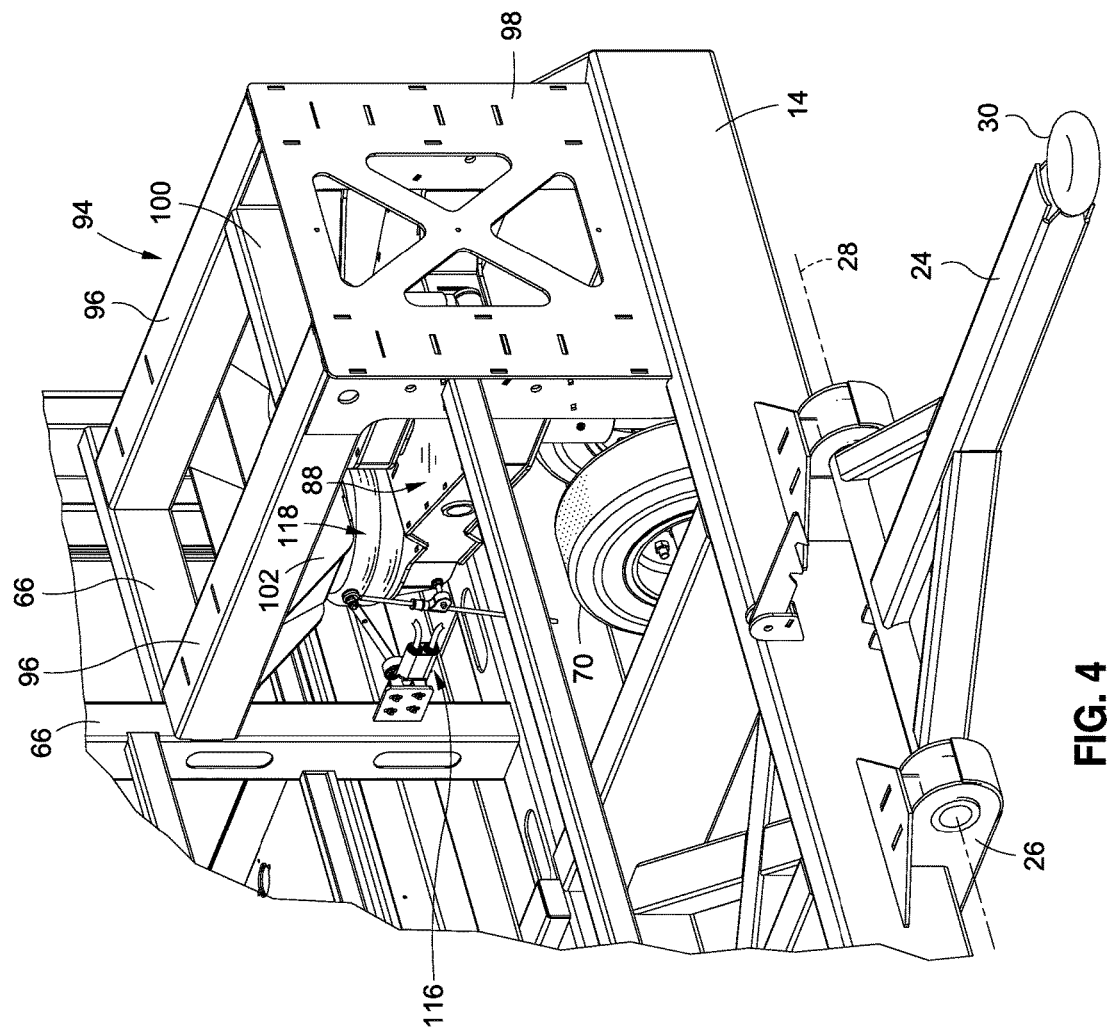
FIG. 4 is a partial upper perspective view of a forward portion of the dolly including a front suspension assembly and a corresponding support structure therefore.

Referring now to the drawings, wherein the showings are for purposes of illustrating a preferred embodiment of the present disclosure, and are not for purposes of limiting the same, there is depicted a dolly 10 specifically configured and adapted for transporting cargo to and from an airplane. The dolly 10 differs from conventional airport cargo dollies due to the inclusion of a suspension assembly adapted to maintain the dolly 10 at a desired loading/unloading level, while at the same time being capable of absorbing shock as the dolly 10 is transported from one location to another.

Figure 11:
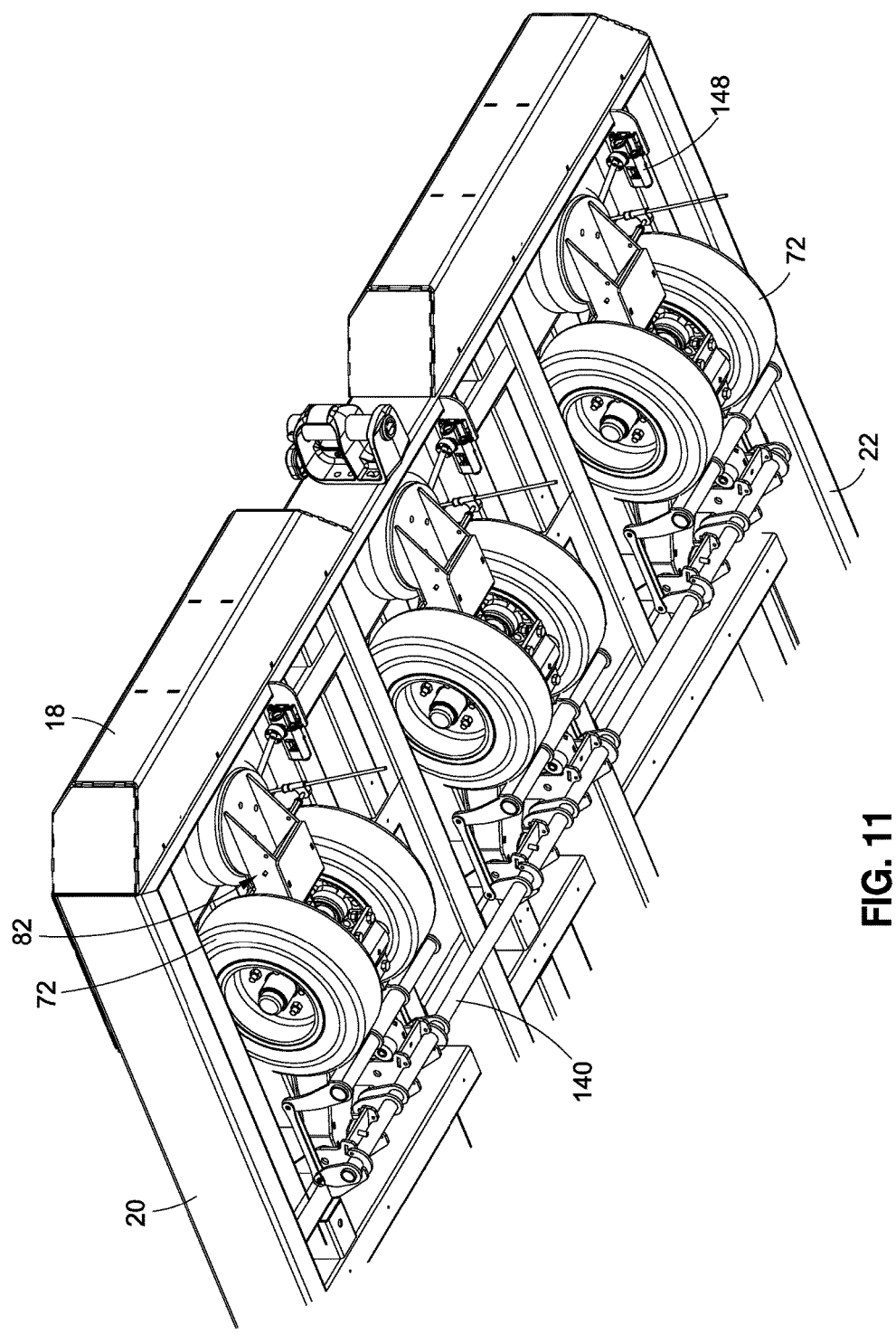
FIG. 11 is a lower perspective view of a rear portion of the dolly to depict a plurality of rear wheels and corresponding rear suspension assemblies.
Figure 12:
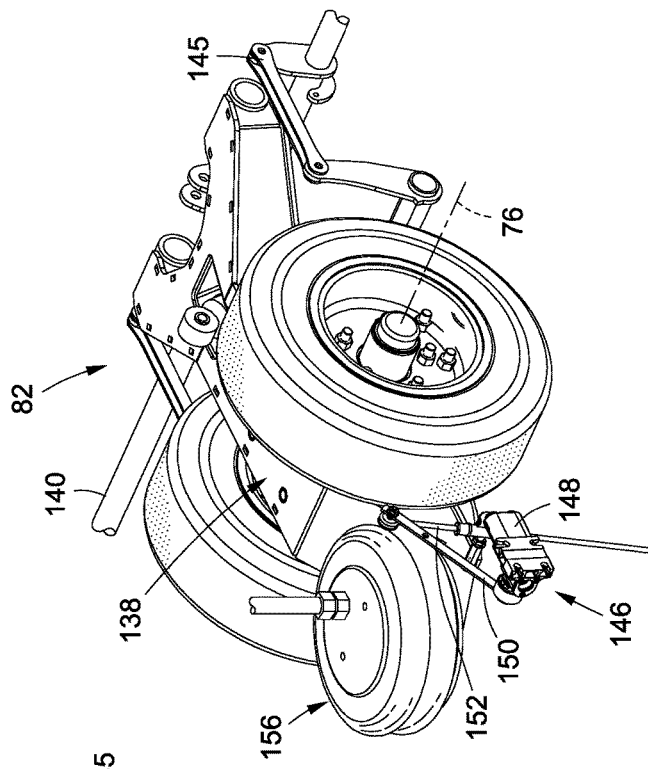
FIG. 12 is an upper perspective view of a rear suspension assembly.
Figure 13:
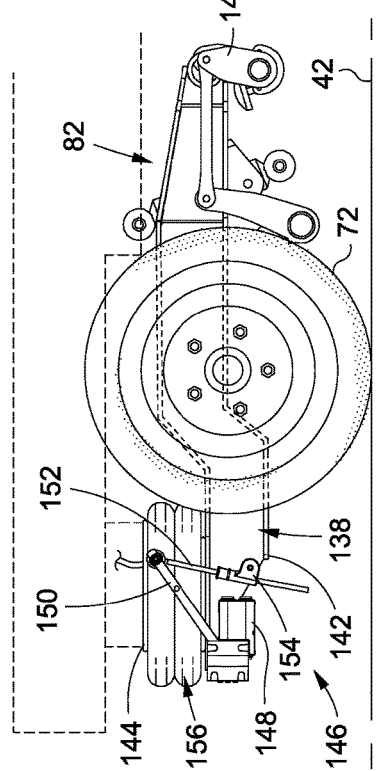
FIG. 13 is a side view of the rear suspension assembly in a first position.

The dolly 10 includes a chassis 12 including a front chassis member 14, an intermediate chassis member 16, and a rear chassis member 18 spaced from one another and extending in generally parallel relation to each other. A pair of side chassis members 20, 22 (see FIG. 11) are coupled to the front, intermediate and rear chassis members 14, 16, 18 and extend in generally opposed relation to each other. Each side chassis member 20, 22 includes a forward section and a rearward section, with the forward section extending between the front and intermediate chassis members 14, 16 and the rearward section extending between the intermediate and rear chassis members 16, 18. The chassis members may be formed from metal or other materials known in the art. The chassis 12 may additionally include additional chassis members to provide further structural support.

A tow bar 24 is attached to the front chassis member 14 and a hitch 25 may be coupled to the rear chassis member 18. The tow bar 24 is coupled to the front chassis member 14 a connecting bracket 26 which allows the tow bar 24 to pivot relative to the chassis 12. In particular, the tow bar 24 may be coupled to the connecting bracket 26 via journals or bearings which allow for pivotal motion of the tow bar 24 about a pivot axis 28. The tow bar 24 includes a distal end portion 30 adapted to be connected to a towing vehicle, such as a towing tractor, as is commonly used at airports for towing trailers and dollies. For instance, the distal end portion 30 may include an opening adapted to receive a pin which connects the tow bar 24 to the towing vehicle.

A deck 32 is coupled to the chassis 12, with the deck 32 being adapted to support cargo thereon. The deck 32 includes a deck plate 36 and a plurality of deck rollers 38 extending through the deck plate 36. According to one embodiment, the deck plate 36 extends between the intermediate chassis member 16 and the rear chassis member 18, with the front chassis member 14 being spaced forwardly from the deck plate 36. Therefore, as cargo is placed on the deck 32, the weight of the cargo will be placed between the intermediate chassis member 16 and the rear chassis member 18, which provides room from the front suspension and enhances maneuverability of the dolly 10, as will be described in more detail below.

Each roller 38 includes a roller ball located within a roller ball housing, with the roller ball being capable of rotating within the housing. Cargo may be slid onto the deck 32 on top of the roller balls to facilitate entry and removal of cargo to and from the dolly 10. The top of the roller balls preferably reside within a common deck plane 40 (see FIG. 15), which is spaced above an underlying ground plane by a deck height H. Of course, other embodiments may not include rollers 38, and instead, cargo may be placed directly on the deck plate 36. In that case, the deck plate 36 resides within the deck plane 40. In this regard, the term "deck plane" is being used broadly herein and is associated with the surface of the dolly 10 upon which cargo is placed when loaded onto the dolly 10.

The dolly 10 may optionally be outfitted with one or more pegs 44 coupled to the deck plate 36. Each peg 44 is located within a peg opening 46 formed in the deck plate 36, and may be selectively transitional between a retracted position and an extended position. When the peg 44 is in the retracted position, a peg surface 48 is positioned flush with the deck plate 36, or below the deck plate 36, and thus, the peg 44 does not extend above the deck plate 36. When the peg 44 is in the extended position, the peg surface 48 is located above the deck plate 36. The pegs 44 may be placed in the retracted position when loading/unloading cargo, with the pegs 44 being transitioned to the extended position when cargo is located on the deck 32 to prevent the cargo from inadvertently sliding off the deck 32. It is contemplated that the pegs 44 transition between the retracted and extended positions by pivoting relative to the deck plate 36. In other words, the pegs 44 may be "flipped up" when transitioning from the retracted position to the extended position, and may be "flipped down" when transitioning from the extended position to the retracted position. However, it is understood that in other embodiments the pegs 44 may be spring-loaded pegs, with the pegs 44 being lockable in retracted position, and releasable therefrom by pressing down on the pegs 44 to unlock the pegs 44 to allow the spring-biasing force to transition the pegs 44 toward the extended position.

The dolly 10 further includes a housing 50 coupled to the chassis 12. The housing 50 and the deck 32 collectively define an enclosure for receiving the cargo. According to one embodiment, the housing 50 includes a front wall 52, a first side wall 54, a second side wall 56 in generally opposed relation to the first side wall 54, and a rear wall 58 in generally opposed relation to the front wall 52. A ceiling or roof 60 may extend over the deck 32 and cover the enclosure. The walls 52, 54, 56, 58 and ceiling 60 are shown in FIG. 1, but have been removed from FIG. 2 to illustrate the internal support structure for the walls 52, 54, 56, 58 and ceiling 60. According to one embodiment, at least one of the walls, and preferably two of the walls have doors operatively coupled thereto. In the exemplary embodiment, the first side wall 54 includes a side opening which may be covered by a side door 62 and the rear wall 58 includes a rear opening which may be covered by a rear door 64. Each door may be separately and individually transitioned between open and closed positions relative to the respective openings which the doors cover. The doors 62, 64 may have a latch or lock which maintains the respective door in the closed position.

The walls of the housing 50 may be coupled to support members 66, which are coupled to the chassis 12. The support members 66 may include both vertical and horizontal support elements to provide adequate support to the housing 50.

A temperature control unit 68 may be coupled to the housing 50 and adapted to control a temperature within the enclosure. In particular, the temperature control unit 68 may include an air conditioner for cooling the temperature within the enclosure, as well as a heater for heating the temperature within the enclosure. For instance, the cargo placed within the enclosure may include temperature-sensitive products, such as food or pharmaceuticals, which may be damaged if subjected to extreme temperatures, as is often the case when the dolly 10 sits on a tarmac. Thus, the temperature control unit 68 may be set to maintain a desired temperature within an acceptable temperature range (e.g., +/−2 degrees from the desired temperature). The housing 50 and deck 32 may be filled with insulation to mitigate heat transfer with the external environment through the housing and/or the deck 32.

The dolly 10 includes a plurality of front wheels 70 and a plurality of rear wheels 72 coupled to the chassis 12 to facilitate movement of the dolly 10 and to support the weight of the cargo placed in the dolly 10, with the front and rear wheels 70, 72 being adapted to roll on the ground plane 42. In the exemplary embodiment, the dolly 10 includes two pairs of front wheels 70 and three pair of rear wheels 72. Each pair of front wheels 70 is rotatable about a respective front wheel axis 74, and each pair of rear wheel 72 is rotatable about a respective rear wheel axis 76 to effectuate movement of the dolly 10 in a forward and rearward direction. Each pair of front wheels 70 is additionally capable of swiveling 360 degrees about a swivel axis 78 generally perpendicular to the ground plane 42 to enable steering of the dolly 10. In this regard, each pair of front wheels 70 may function as a caster, enabling steering of the dolly 10 about a relatively small turning radius. The rear wheels 72 are not capable of swiveling.

Each pair of front wheels 70 is coupled to the chassis 12 via a respective front suspension assembly 80, and each pair of rear wheels 72 is coupled to the chassis 12 via a respective rear suspension assembly 82. The front and rear suspension assemblies 80, 82 differ from each other, as will be described in more detail below.

Figure 6:
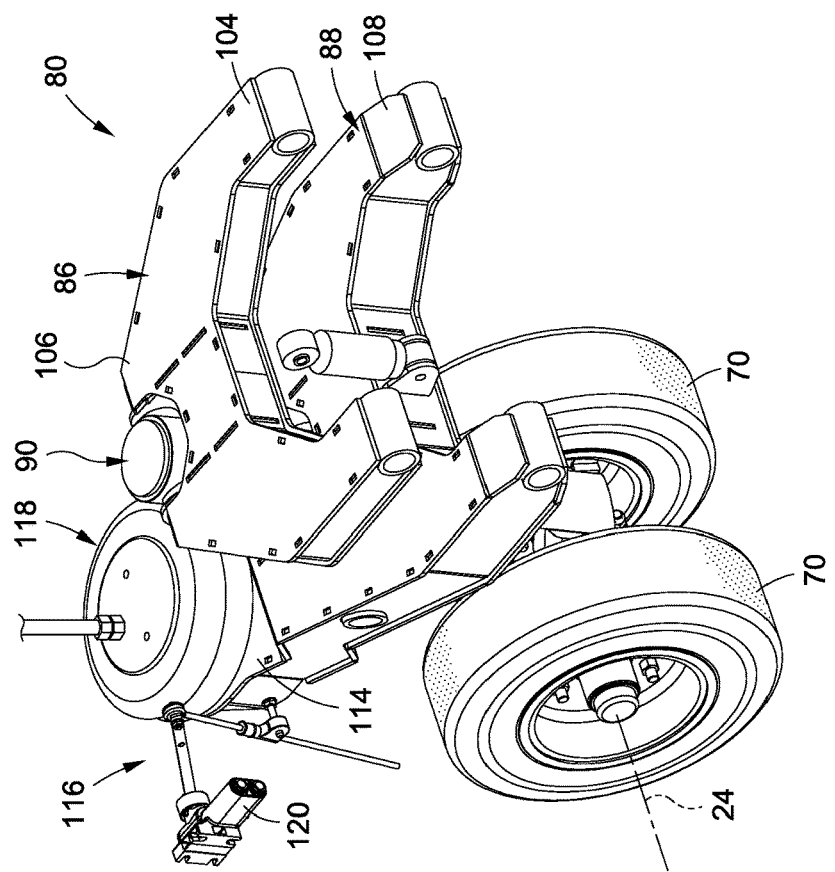
FIG. 6 is a rear upper perspective view of the front suspension assembly and front wheels shown in FIG. 5.
Figure 5:
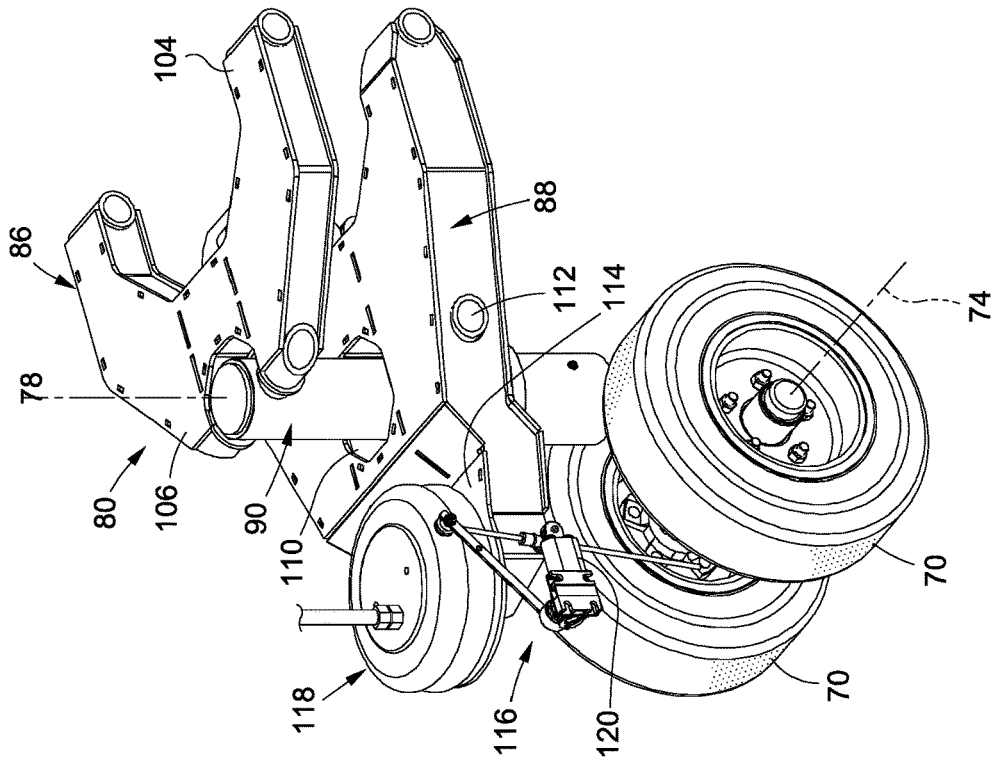
FIG. 5 is a front upper perspective view of a front suspension assembly coupled to a pair of front wheels.

Each front suspension assembly 80 is adapted to enable movement of a corresponding front wheel axis 74 relative to the chassis 12 along a suspension axis 84, and also allows for swiveling of the front wheels 70 about the swivel axis 78, which may be aligned with the suspension axis 84. The ability of the front wheels 70 to swivel 360 degrees, while also being coupled to a front suspension arm provides a significant departure from conventional dolly wheels. FIGS. 5 and 6 are front and rear upper perspective views of a front suspension assembly 80, which generally includes a first arm 86, a second arm 88, and a suspension rod 90. Each front suspension assembly 80 is coupled to the chassis 12 via a front support frame 94 (see FIG. 4), which includes a pair of upper support members 96 and a front plate 98. The upper support members 96 extend between the front plate 98 and the support member(s) 66 of the housing 50. A brace 100 may extend between the upper support members 96 to provide stabilization therebetween as well as to provide shock absorber mounting. The front support frame 94 further includes a press-bracket 102, which is positioned in generally opposed relation to a portion of the second arm 88.

The first arm 86 of the front suspension assembly 80 includes a first end portion 104 pivotally coupled to the front support frame 94, and a second end portion 106 pivotally coupled to the suspension rod 90. In the exemplary embodiment, the first end portion 104 includes a pair of fingers, each being pivotally coupled to the front support frame 94, while the second end portion 106 is pivotally coupled to diametrically opposed portions of the suspension rod 90.

The second arm 88 includes a first end portion 108 pivotally coupled to the front support frame 94 and an aperture 110 through which the suspension rod 90 extends. The second arm 88 is pivotally coupled to the suspension rod 90 via a pivot bearing 112. The second arm 88 further includes a press-plate 114 in generally opposed relation to the press-bracket 102 of the front support frame 94.

The pivotal connection of the first and second arms 86, 88 to the front support frame 94 allows the first and second arms 86, 88 to also pivot relative to the chassis 12. Furthermore, since the first pivot arm 86 and the second pivot arm 88 are also pivotally connected to the suspension rod 90, the first pivot arm 86 remains generally parallel to the second pivot arm 88 as the arms 86, 88 transition through their pivotal range of motion. Along these lines, a portion of the first arm 86 resides in a first plane, and a portion of the second arm 88 may reside in a second plane, with the first and second planes remaining substantially parallel to each other as the first and second arms 86, 88 pivot relative to the chassis 12.

Figure 8:
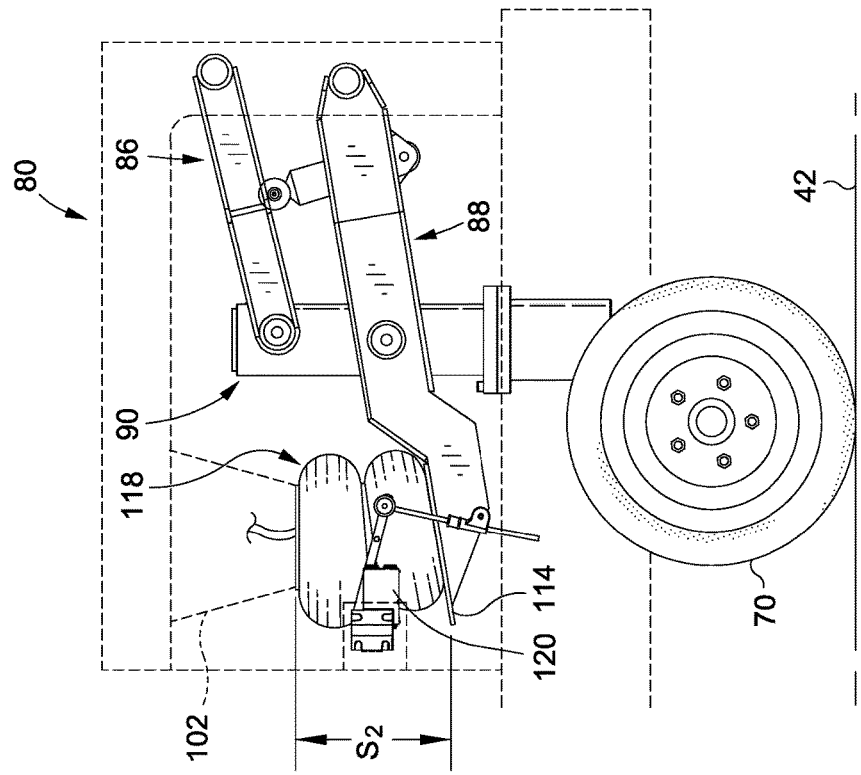
FIG. 8 is a side view of the front suspension assembly in a second position.
Figure 7:
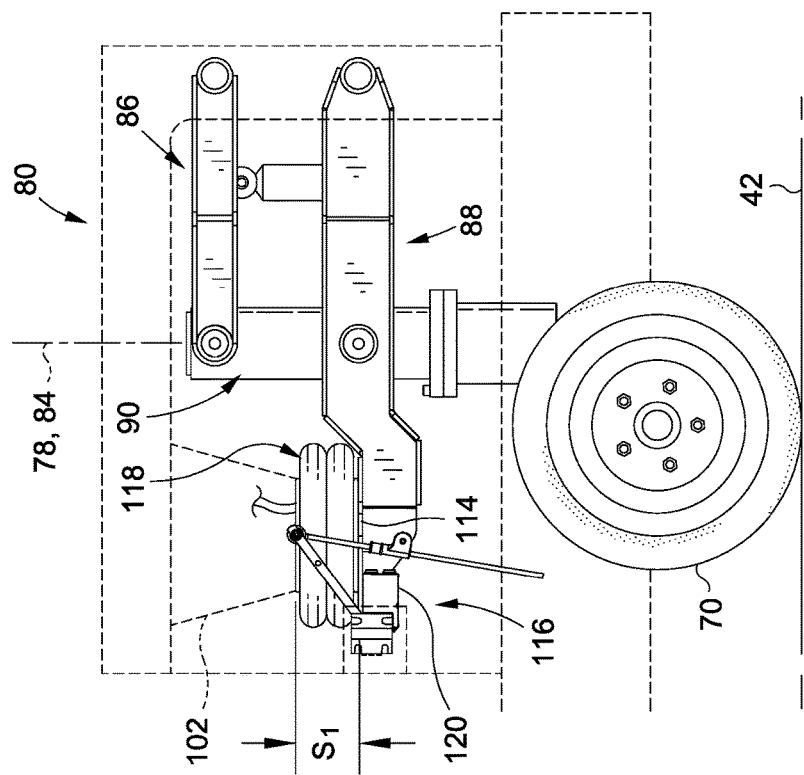
FIG. 7 is a side view of the front suspension assembly in a first position.
Figure 9:
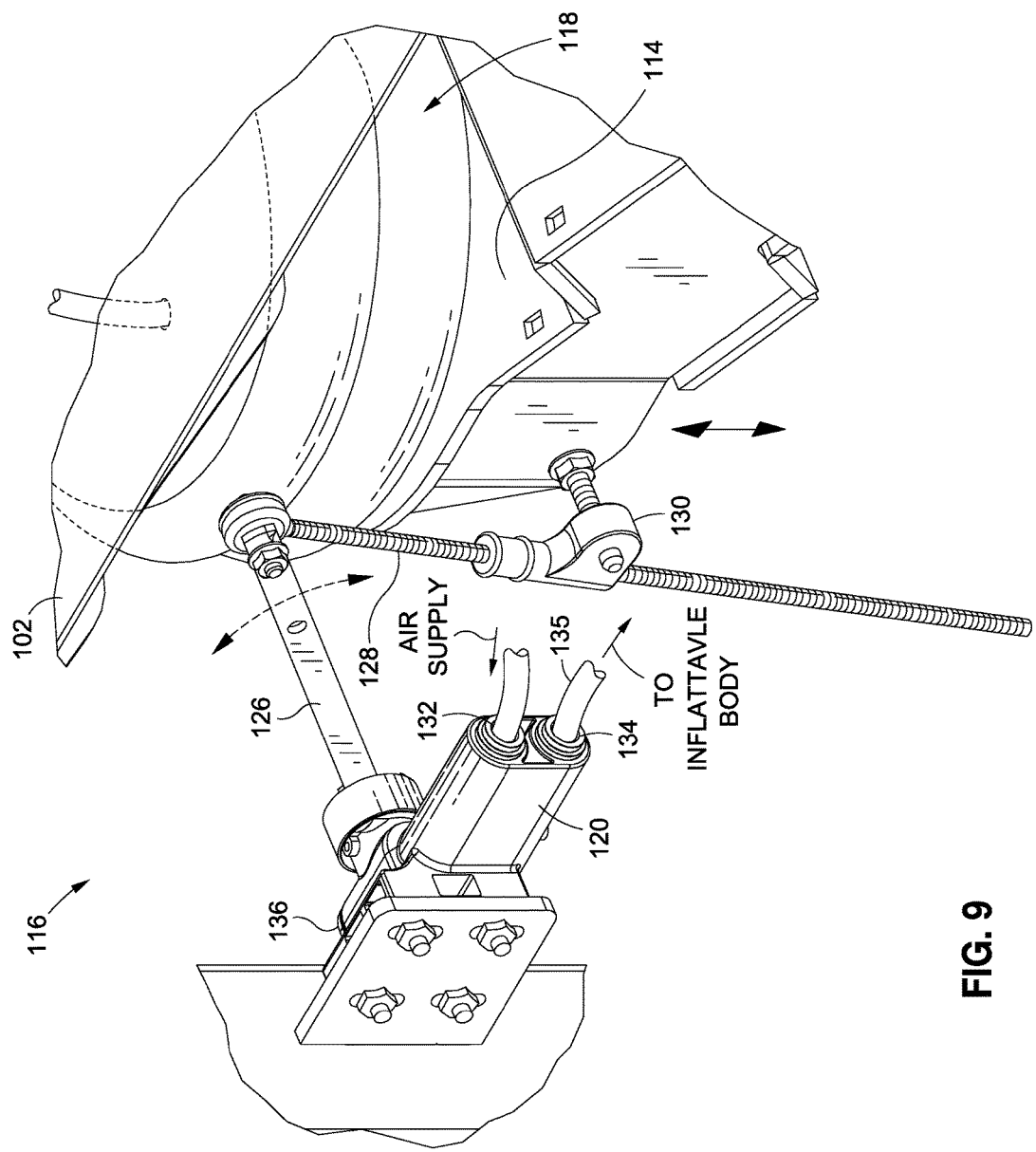
FIG. 9 is an upper perspective view of a front leveler operatively coupled to the front suspension assembly.

The first and second pivot arms 86, 88 are adapted to pivot relative to the chassis 12 to control the height of the deck 32 relative to the ground plane 42. Referring now specifically to FIGS. 7 and 8, the front suspension assembly 80 is shown in two different positions. In FIG. 7, the front suspension assembly 80 is shown in a first position, with the press-bracket 102 of the front support frame 94 being spaced from the press-plate 114 of the second pivot arm 88 by a first suspension distance $S_1$. In FIG. 8, the front suspension assembly 80 is shown in a second position, with the press-bracket 102 of the front support frame 94 being spaced from the press-plate 114 of the second pivot arm 88 by a second suspension distance $S_2$ greater than the first suspension distance $S_1$. In this respect, as the front suspension assembly 80 transitions from the first position to the second position, the front portion of the deck 32 may be raised relative to the ground plane 42. Conversely, as the front suspension assembly 80 transitions from the second position to the first position, the front portion of the deck 32 may be lowered relative to the ground plane 42.

According to one embodiment, the position of the front suspension assembly 80 is adjusted by a front leveler 116, which includes an inflatable body 118 and a control valve 120 for inflating/exhausting the inflatable body 118. In this respect, the control valve 120 is fluidly coupled to a source of pressurized fluid 122 (e.g., air), as well as being fluidly coupled to the inflatable body 118. The inflatable body 118 is selectively transitional between an inflated configuration and a deflated configuration, wherein transition from the deflated configuration toward the inflated configuration enables the front suspension assembly 80 to apply an increased suspension force on the dolly chassis 12 to counteract an increased load applied on the front suspension assembly 80 from the chassis 12.

The front leveler 116 further includes a control lever 126, a linkage 128, and a connector 130. The control valve 120 is mounted to the front support frame 94, while the connector 130 is mounted to the second pivot arm 88. Pivotal movement of the second pivot arm 88 causes the control lever 126 to pivot relative to the control valve 120, which in turn, opens or closes the control valve 120 to regulate the volume of the inflatable body 92. Along these lines, the control valve 120 includes a supply port 132 which receives pressurized fluid from the pressurized fluid source 122, a delivery port 134 which delivers pressurized fluid to the inflatable body 92 via delivery tube 135, and an exhaust 136 which allows fluid from the inflatable body 92 to be exhausted to the ambient environment.

When the control lever 126 pivots to a first position corresponding to a low deck height H, the control valve 120 is opened to allow pressurized fluid from the pressurized fluid source 122 to flow to into the control valve 120 through the supply port 132, and then exit the control valve 120 via the delivery port 134 for delivery to the inflatable body 118. When the inflatable body 118 is inflated to a desired position, the control lever 126 will pivot to a second position associated with an acceptable deck height H, which closes the control valve 120 to prevent further inflation of the inflatable body 118. When the control lever 126 pivots to a third position corresponding to a high deck height H, the exhaust valve is opened to allow fluid to be exhausted from the inflatable body 118.

An exemplary control valve 120 is the Extreme Air™ height control valve from Ridewell Suspensions, although other control valves/mechanisms known in the art may also be used without departing from the spirit and scope of the present disclosure.

Turning now to the rear portion of the dolly 12, and referring specifically to FIGS. 11-14, each rear suspension assembly 82 is operatively coupled to a pair of rear wheels 72 and the chassis 12, and includes a rear suspension arm 138. The rear suspension arm 138 includes a rear suspension press-plate 142, which is positioned in generally opposed relation to a rear chassis press-plate 144 coupled to the chassis 12. A brake bar 140 extends under the deck 32 and is mounted to each rear suspension arm 138. A multiple linkage assembly 145 may extend between the brake bar 140 and the rear suspension arm 138. The brake bar 140 may be associated with a rear parking brake, which may be activated by the tow bar 24. In particular, the brake bar 140 may be operatively coupled to the tow bar 24, such that when the tow bar 24 is lifted upwardly from its normal towing position, a parking brake associated with the brake bar 140 may be activated.

A rear leveler 146 is operatively coupled to the rear suspension assemblies 82 and is adapted to individually adjust the rear suspension assemblies 82 for adjusting the position of the rear portion of the deck 32. This is effectively achieved by adjusting the distance between the rear wheel axes 76 and the chassis 12. The rear leveler 146 is similar to the front leveler 116 discussed above, and generally includes a control valve 148, control lever 150, a linkage 152, and a connector 154 and an inflatable body 156. Each control valve 148 is mounted to the chassis 12 via a mounting bracket, while the connector 154 is mounted to the rear suspension arm 138. Pivotal movement of the rear suspension arm 138 causes the control lever 150 to pivot relative to the control valve 148, which in turn, opens or closes the control valve 120 to regulate the volume of the inflatable body 156. Along these lines, the control valve 120 includes a supply port which receives pressurized fluid from the pressurized fluid source 122, a delivery port which delivers pressurized fluid to the inflatable body 156 via delivery tube, and an exhaust which allows fluid from the inflatable body 156 to be exhausted to the ambient environment.

When the control lever 150 pivots to a first position corresponding to a low deck height H, the control valve 148 is opened to allow pressurized fluid from the pressurized fluid source 122 to flow to into the control valve 148 through the supply port, and then exit the control valve 148 via the delivery port for delivery to the inflatable body 156. When the inflatable body 156 is inflated to a desired position, the control lever 150 will pivot to a second position associated with an acceptable deck height H, which closes the control valve 148 to prevent further inflation of the inflatable body 156. When the control lever 150 pivots to a third position corresponding to a high deck height H, the exhaust valve is opened to allow fluid to be exhausted from the inflatable body 156.

Figure 14:
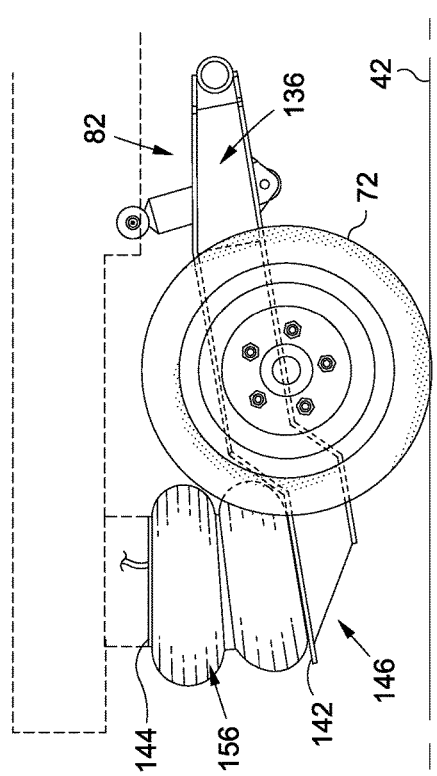
FIG. 14 is a side view of the rear suspension assembly in a second position.

Please note that some structure, including the rear leveler 146, has been removed or modified from FIG. 14 to more clearly illustrate the position of the rear suspension arm 138 and the inflatable body 156.

The front leveler 116 and the rear leveler 146 are collectively configured to adjust the front suspension assemblies 80 and the rear suspension assemblies 82 to maintain the deck 32 at a prescribed distance relative to the ground plane 42. In this respect, it is understood that as cargo is loaded on the deck 32, the deck height will decrease, thereby creating an offset between the loading dock and the dolly deck 32, which makes subsequent loading of the dolly 32 difficult or unsafe. Therefore, the levelers 116, 146 can adjust the deck height to maintain the deck height at the same height as the loading dock, and level with the loading dock. Thus, if cargo is loaded toward the back of the deck 32, the rear suspension assemblies 82 may be adjusted more than the front suspension assemblies 80. Since various implementations of the dolly 10 may be specifically configured for use in transporting cargo for loading on airplanes, it is known that many air cargo loading docks are universally set at between 18-23 inches, and more particularly 20.5 inches. Thus, the front leveler 116 and the rear leveler 146 may be collectively configured to maintain the deck height between 18-23 inches, and more specifically 20.5 inches. Furthermore, the front levelers 116 and the rear levelers 146 may be further collectively configured to adjust the respective front suspension assemblies 80 and rear suspension assemblies 82 to maintain the deck 32 substantially parallel to the ground plane 42. Although the foregoing describes the deck height as being set to be maintained between 18-23 inches, it is understood that the dolly may be configured to set the deck height at other heights. Furthermore, the dolly may include an input device (e.g., joystick, keypad, etc.) to allow the user to set the deck height.

Figure 10:
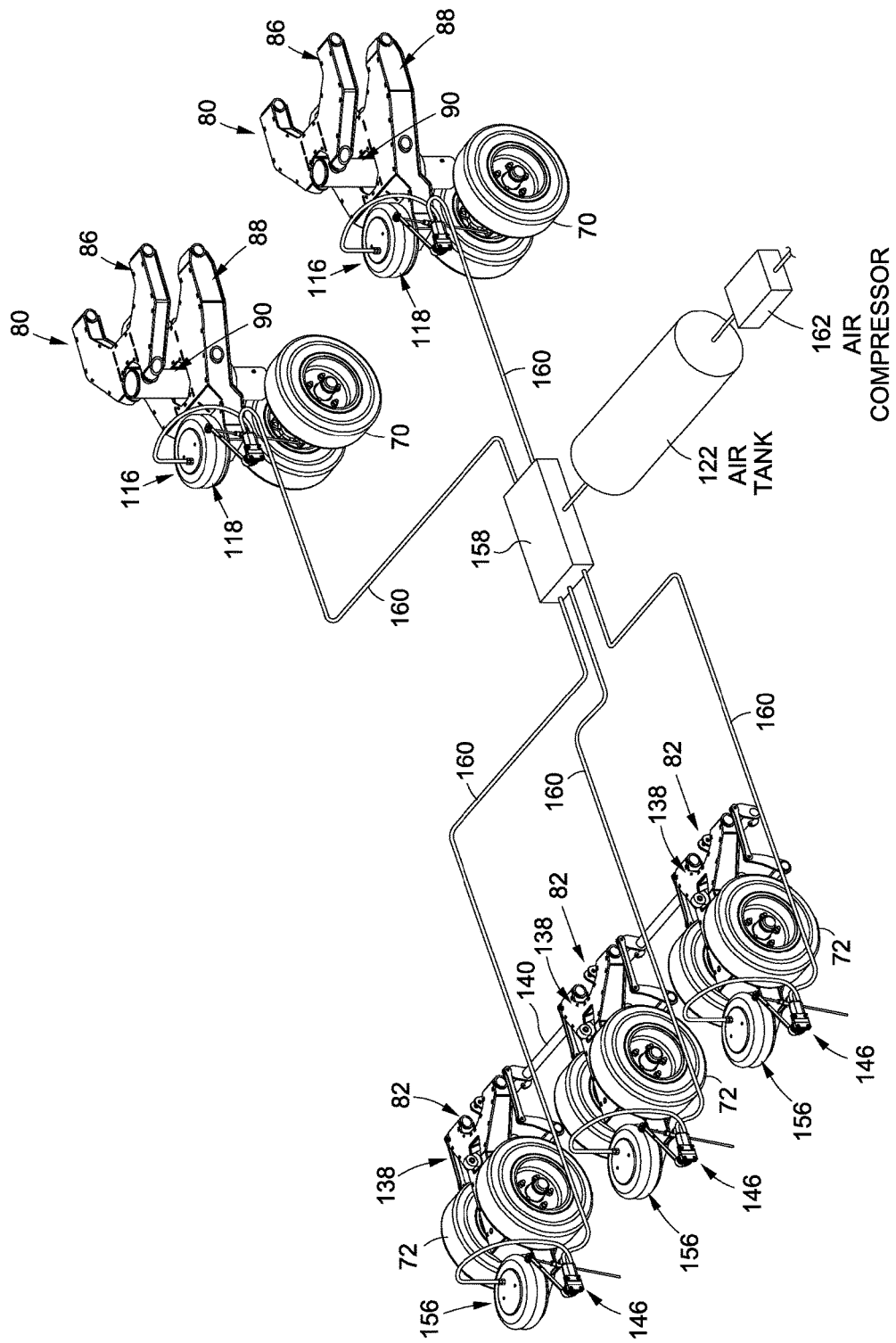
FIG. 10 is a schematic view of a pneumatic system used to control the front and rear suspension assemblies.

Referring now to FIG. 10, there is shown an exemplary pneumatic system associated with the suspension described herein. In particular, a pressurized fluid source 122 (e.g., air tank) is fluidly coupled to the front and rear levelers 116, 146 via a manifold 158 and hoses 160. A compressor 162 is coupled to the pressurized fluid source 122 to refill the pressurized fluid source 122 with fluid and maintain the pressure therein at a prescribed pressure level. The pressurized fluid source 122, air compressor 162, and manifold 158 may be located within the dolly enclosure and separated from the main loading area of the deck by a bar 164 so as to prevent inadvertent contact between the cargo and the pressurized fluid source 122.

With the basic structure of the dolly 10 described above, the following discussion will highlight an exemplary use of the dolly 10 for transporting cargo. The dolly 10 may be positioned next to a loading dock to receive cargo therefrom. The side door 62 and/or the rear door 64 may be used to load the cargo onto the dolly 10. As the cargo is loaded on the dolly 10, the cargo is received on the deck 32. The suspension assembly (e.g., the front and rear suspension assemblies 80, 82) is adapted to impart a variable suspension force on the deck 32. Such suspension force is adjusted so as to maintain the deck surface at a prescribed distance from the ground plane. In particular, the suspension force is increased as a weight associated with the cargo increases, as may be the case when cargo is loaded onto the dolly 10, and the suspension force is decreased as the weight associated with the cargo decreases, as may be the case when cargo is unloaded from the dolly 10.

The suspension force is adjusted by adjusting a fluid pressure within one or more of the inflatable bodies 118, 156 associated with the front and rear suspension assemblies 80, 82 to adjust the suspension force imparted on the deck 32. The suspension force may be selectively increased by adding fluid to the inflatable bodies 118, 156 to increase the fluid pressure, and the suspension force may be selectively decreased by exhausting fluid from the inflatable bodies 118, 156.

While the cargo is located within the dolly 10, the temperature within the enclosure may be monitored and adjusted to maintain the temperature within the enclosure within a prescribed temperature range.

The inclusion of the suspension on the dolly 10 may allow the dolly 10 to be transported between an airplane and a loading dock at a speed that is greater than conventional temperature controlled dollies. In particular, the suspension assembly absorbs shock loads/vibrations generated as the dolly travels over uneven terrain at higher speeds, which in turn protects delicate components associated with the temperature control unit 68, as well as the cargo located within the dolly 10. In this regard, the dolly 10 may be particularly suitable for carrying berries or other shock sensitive products, which require transport in a temperature controlled environment, and which may bruise if subject to large vibrations.

Although the exemplary embodiment shows the dolly specifically configured and adapted for use in transporting cargo to and from an airplane, it is understood that other embodiments of the dolly may be configured for other uses. For instance, the dolly may be used to transport high value items, such as money/currency. The dolly may also be used as a quarantine or as a freezer to freeze bugs or undesirable cargo to destroy it if it is so needed.

The above description is given by way of example, and not limitation. Given the above disclosure, one skilled in the art could devise variations that are within the scope and spirit of the disclosure disclosed herein, including various ways of implementing a suspension on a cargo dolly. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An air cargo transport dolly comprising:
a chassis;
a deck coupled to the chassis and having a deck surface spaced from a ground plane by a first distance and defining a deck outer periphery;
at least two front wheels coupled to the chassis and rotatable about respective front wheel axes, the at least two front wheels being rollable on the ground plane and pivotable about respective swivel axes perpendicular to the front wheel axes and positioned outwardly from the deck outer periphery;
at least two rear wheels coupled to the chassis and rotatable about respective rear wheel axes, the at least two rear wheels being in spaced relation to the at least two front wheels and rollable on the ground plane;
at least two front suspension assemblies connecting respective ones of the at least two front wheels to the chassis, each of the front suspension assemblies enabling movement of a corresponding front wheel axis relative to the chassis;
at least two rear suspension assemblies connecting respective ones of the at least two rear wheels to the chassis, each of the rear suspension assemblies enabling movement of a corresponding rear wheel axis relative to the chassis;
at least two front levelers, each of the front levelers having an inflatable body positioned outwardly from the deck outer periphery and operatively coupled to a respective one of the at least two front suspension assemblies and capable of adjusting the respective one of the at least two front suspension assemblies for moving the corresponding front wheel axes relative to the chassis; and
at least two rear levelers, each of the rear levelers being operatively coupled to a respective one of the at least two rear suspension assemblies and capable of adjusting the respective one of the at least two rear suspension assemblies for moving the corresponding rear wheel axes relative to the chassis;
the at least two front levelers and the at least two rear levelers collectively being configured to adjust the respective at least two front suspension assemblies and the at least two rear suspension assemblies to maintain the deck at the first distance relative to the ground plane.

2. The air cargo transport dolly recited in claim 1, wherein the at least two front levelers and the at least two rear levelers are collectively configured to maintain the first distance between 19 and 22 inches.

3. The air cargo transport dolly recited in claim 1, wherein the at least two front levelers and the at least two rear levelers are further collectively configured to adjust the respective at least two front suspension assemblies and at least two rear suspension assemblies to maintain the deck substantially parallel to the ground plane.

4. The air cargo transport dolly recited in claim 1, the inflatable body being selectively transitional between an inflated configuration and an deflated configuration, wherein transition from the deflated configuration toward the inflated configuration enables the front suspension assembly to counteract an increased load applied on the suspension from the chassis.

5. The air cargo transport dolly recited in claim 4, further comprising a source of pressurized fluid fluidly connected to the at least one inflatable body.

6. The air cargo transport dolly recited in claim 4, wherein each front suspension assembly includes:
- a first arm pivotable relative to the chassis, a portion of the first arm residing in a first plane;
- a second arm operatively coupled to the first arm, the second arm being pivotable relative to the chassis, a portion of the second arm residing in a second plane;
- the first and second planes remaining parallel to each other as the first and second arms pivot relative to the chassis.

7. The air cargo transport dolly recited in claim 6, wherein each front suspension assembly further includes a rod pivotally coupled to the first arm and the second arm and extending through an opening formed in at least one of the first arm and the second arm.

8. The air cargo transport dolly recited in claim 1, further comprising a housing coupled to the chassis, the housing and the deck being configured to collectively define an enclosure for storing cargo.

9. The air cargo transport dolly recited in claim 8, wherein the housing includes least one door.

10. The air cargo transport dolly recited in claim 8, further comprising a temperature control unit coupled to the housing for controlling a temperature within the enclosure.

11. The air cargo transport dolly recited in claim 8, further comprising:
- a front support frame coupled to the chassis and housing, the front support frame extending upwardly from the chassis, the front support frame having a press bracket;
- the inflatable body being coupled to the press bracket and the respective one of the at least two front assemblies.

\* \* \* \* \*